United States Patent [19]
Nedsten

[11] 3,938,417
[45] Feb. 17, 1976

[54] NOISE-SUPPRESSED CIRCULAR SAW BLADE

[75] Inventor: Hans Ludvig Nedsten, Trollhattan, Sweden

[73] Assignee: AB Stridsberg & Blorck, Trollhattan, Sweden

[22] Filed: Nov. 14, 1974

[21] Appl. No.: 523,983

[30] Foreign Application Priority Data
Nov. 28, 1973 Sweden .......................... 73160509

[52] U.S. Cl. ................................. 83/835; 144/218
[51] Int. Cl.² ....................................... B27B 33/08
[58] Field of Search ....... 83/855, 835; 144/218, 240

[56] References Cited
UNITED STATES PATENTS

| 198,142 | 12/1877 | Morreau | 83/835 |
|---|---|---|---|
| 334,440 | 1/1886 | Ireland | 83/835 |
| 1,861,218 | 5/1932 | Huther | 83/835 |
| 3,854,364 | 12/1974 | Sundstrom | 83/835 |

Primary Examiner—Frank T. Yost
Attorney, Agent, or Firm—Plumley & Tyner

[57] ABSTRACT

A circular saw blade provided with a circumferential zone which extends radially inside the saw blade teeth and has a reduced thickness relative to the saw blade, whereby the noise generated at high operational speeds is considerably diminished.

4 Claims, 2 Drawing Figures

NOISE-SUPPRESSED CIRCULAR SAW BLADE

BACKGROUND OF THE INVENTION

When the steel blade of a circular saw rotates at high speeds it generates a disturbing sound. As saw blades to-day operate at speeds of between 60 and 90 meters per second and the tendency is to accelerate the speed even further, which seems possible in view of the increasingly improved constructions and materials, the need for noise-suppressed saw blades becomes more and more pronounced.

Several ways of solving this problem have been suggested. On the market exists for instance so-called sandwich saw blades consisting of two core discs put together, with a layer of paper (cellulose) or other suitable noise-suppressing material between them, these discs being welded at their peripheries to a toothed rim of hard metal. One disadvantage with this type of circular saw blades is that after a period of operational life with the saw blade working on tree trunks and similar materials, the noise-reducing material will gasify on account of the extremely high temperatures that occur locally on the blade, or else deteriorate in some other way, whereby the noise-reducing effect of the material is lost. Another suggested improvement is the boring of holes through the blade, whereafter the holes are filled with copper plugs. The noise-reducing effect is, however, comparatively small. In accordance with a third suggestion, noise-reducing screens are attached to the sawing machine proper at either side of the saw blade below the saw table, whereby the lower portion of the blade will rotate between the screens. One disadvantage of this arrangement is that when the saw blade is removed from its shaft or spindle, for instance when the saw teeth are to be reground, it is necessary to dismantle at least one of the two noise-reducing screens, usually the outer one.

SUMMARY OF THE PRESENT INVENTION

The purpose of the present invention is to remedy the drawbacks enumerated above. The invention concerns noise-suppressed circular saw blades of the kind having teeth welded or brazed thereon and wherein the bottom portion of the gap between subsequent teeth extends to a point positioned closer to the saw blade centre than the radially inner end of the teeth. It is characteristic of the invention that the core disc of the saw blade is provided radially inside the teeth with a circumferential zone extending between the teeth gaps and having a thickness somewhat less than the thickness of the disc. The invention is based on the knowledge that the disturbing noise experienced during the operation of the saw blade largely is caused by compression of the air present in the gaps between the individual teeth. The aim then is to screen off the sound generator from the sound reproducer - as the sound generator being considered the teeth of the saw blade and as the sound reproducer the disc positioned radially inside the toothed rim of the saw blade. Thus, when the vibrations of the toothed rim, generated by the compression of the air, may be reduced, the level of the disturbing noise will be considerably reduced. Owing to the thinned-out zone in the saw blade the air in the teeth gaps may deflect and consequently no significant compression takes place inside the teeth gaps. Only small vibrations will occur in the toothed rim and as a result the operation of the saw blade will be quieter. The reduction of the thickness of the disc internally of the teeth also has a favourable effect in lowering the noise level of the latter.

BRIEF DESCRIPTION OF THE DRAWINGS

The invention will be described more in detail in the following with reference to the accompanying drawings, wherein.

DETAILED DESCRIPTION OF A PREFERRED EMBODIMENT

Figure 1:
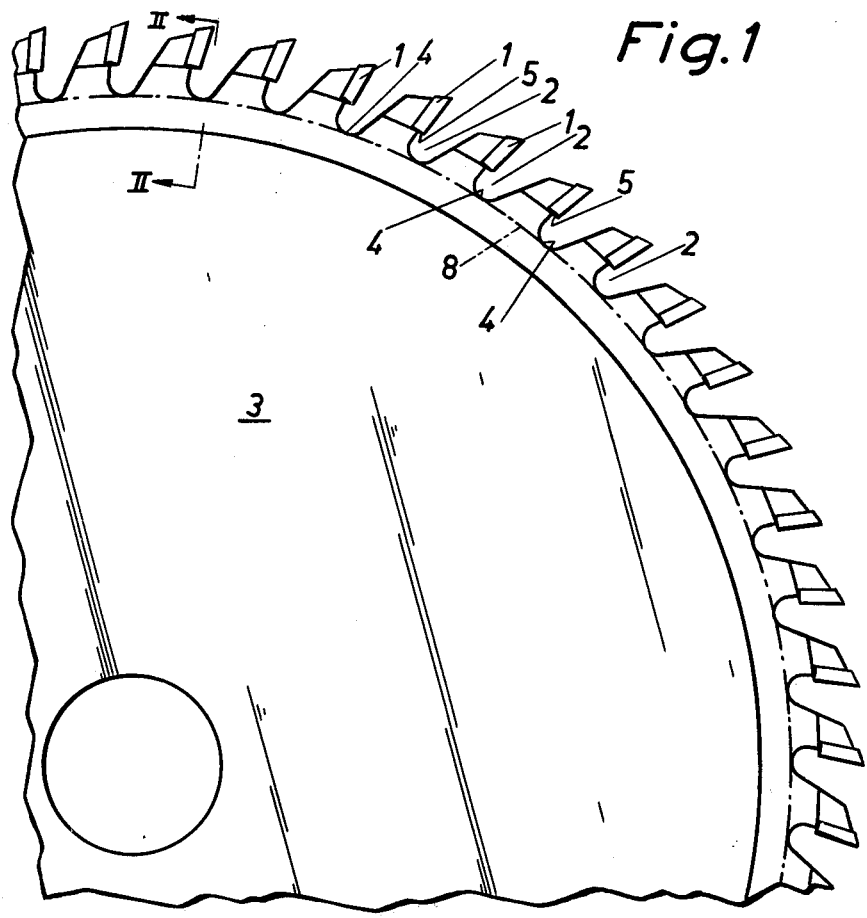
FIG. 1 is a side view of a saw blade incorporating the noise-supressing arrangement in accordance with the invention.

The circular saw blade illustrated in the drawings is imagined made of steel and having hard metal teeth 1. The gaps 2 between the teeth extend into the core disc 3 of the saw blade such that the bottom portions 4 of the gaps become positioned inside the inner end 5 of the teeth.

Figure 2:
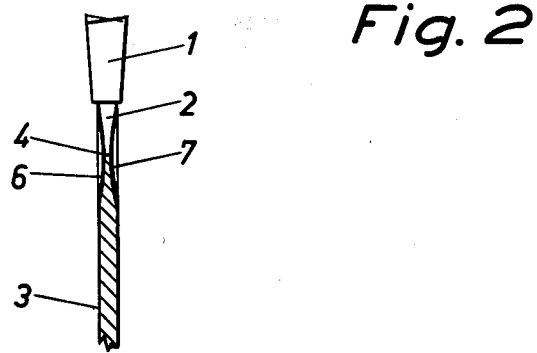
FIG. 2 illustrates on an enlarged scale a cross-sectional view along line II—II of FIG. 1.

On either side of the core 3 is formed a circular groove 6, 7 the longitudinal medium line 8 of which is tangent to the bottoms 4 of the teeth gaps 2. The grooves 6, 7 are preferably ground into the core disc 3. The configuration of the bottom portions of the grooves 6, 7 (see FIG. 2), as seen in cross-sectional direction, follows a circular arc with the deepest point of the grooves positioned at the bottom portions 4 of the teeth gaps 2.

Adjacent teeth gaps 2 thus communicate with one another through the grooves 6, 7. This means that air present in the teeth gaps 2 is able to deviate through the grooves 6, 7.

For a circular saw blade having an outer diameter of 450 millimeters and 90 teeth 1 and a core disc 3 that is approximately 3.2 millimeters thick it has proved suitable to choose a width for the grooves 6, 7 of about 10 millimeters and a depth therefor of appr. 0.6 millimeters. However, these groove widths may vary for various saw blade diameters between appr. 8 and 12 millimeters and the groove depths between appr. 0.5 and 0.7 millimeters. These dimensions may, however, be exceeded, dependent on the material of the saw blade. In some cases it may be sufficient to arrange a groove 6 or 7 on one side only of the core disc 3.

What I claim is:

1. An improved noise-suppressed circular saw blade comprising teeth welded to said blade, gaps formed between subsequent ones of said teeth, the bottom portion of said gaps extending to a point closer to the saw blade centre than the radially inner end of said teeth, the improvement comprising a circumferential zone in the core disc of said saw blade, said zone positioned radially inside said teeth and having a thickness less than the thickness of said core disc and wherein a groove is formed in at least one of the surfaces of said saw blade, the bottom portion of said groove forming said zone and wherein the longitudinal medium line of said groove is essentially tangent to said bottom portion of said teeth gaps.

2. An improved saw blade as claimed in claim 1, wherein the deepest point of said groove bottom portion is positioned at the bottom portion of said teeth gaps.

3. An improved saw blade as claimed in claim 1, wherein the longitudinal medium line of said grooves is essentially a tangent to the bottom portions of said teeth gaps.

4. An improved saw blade as claimed in claim 3, wherein the deepest point of said groove bottom portions are positioned at the bottom portion of said teeth gaps.

* * * * *

UNITED STATES PATENT AND TRADEMARK OFFICE
CERTIFICATE OF CORRECTION

PATENT NO. : 3,938,417

DATED : February 17, 1976

INVENTOR(S) : Hans Ludvig Nedsten

It is certified that error appears in the above-identified patent and that said Letters Patent are hereby corrected as shown below:

In the Assignee Column: AB Stridsberg & Blorck should read

---- AB Stridsberg & Biorck---

Signed and Sealed this twenty-seventh Day of April 1976

[SEAL]

Attest:

RUTH C. MASON
Attesting Officer

C. MARSHALL DANN
Commissioner of Patents and Trademarks